US 10,853,685 B2

(12) United States Patent
Lee et al.

(10) Patent No.: US 10,853,685 B2
(45) Date of Patent: Dec. 1, 2020

(54) METHOD AND APPARATUS FOR DETECTING FOG FROM IMAGE

(71) Applicant: Hanwha Techwin Co., Ltd., Changwon-si (KR)

(72) Inventors: Young Hyun Lee, Changwon-si (KR); Yil Kwon Chang, Changwon-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 145 days.

(21) Appl. No.: 15/641,801

(22) Filed: Jul. 5, 2017

(65) Prior Publication Data

US 2018/0285680 A1    Oct. 4, 2018

(30) Foreign Application Priority Data

Apr. 3, 2017 (KR) .................. 10-2017-0043093

(51) Int. Cl.
*G06K 9/46* (2006.01)
*G06K 9/00* (2006.01)

(52) U.S. Cl.
CPC ....... *G06K 9/4642* (2013.01); *G06K 9/00771* (2013.01); *G06K 9/4652* (2013.01)

(58) Field of Classification Search
CPC ........... G06T 5/001; G06T 5/40; H04N 9/045; H04N 1/6027; H04N 1/60; H04N 1/40012; H04N 1/40018; H04N 1/40025; H04N 1/40031; H04N 1/40037; H04N 1/40043; H04N 1/4005; H04N 1/40056; H04N 1/40062; H04N 1/40068; H04N 1/40075; H04N 9/69; H04N 9/73; H04N 9/735; G06K 9/00771; G06K 9/4642

See application file for complete search history.

(56) References Cited

U.S. PATENT DOCUMENTS

| 7,751,647 | B2 | 7/2010 | Pikaz |
| 8,077,995 | B1 * | 12/2011 | Terre .................. G06T 5/40 |
| | | | 382/276 |
| 2015/0279011 | A1 | 10/2015 | Jeon et al. |
| 2015/0286468 | A1 * | 10/2015 | Vaidya ............... G06F 11/3409 |
| | | | 717/110 |
| 2016/0063684 | A1 | 3/2016 | Park et al. |
| 2016/0350899 | A1 | 12/2016 | Suzuki |

FOREIGN PATENT DOCUMENTS

| JP | 5901667 B2 | 4/2016 |
| KR | 0129242 B1 | 11/1997 |
| KR | 10-2012-0079564 A | 7/2012 |
| KR | 10-1364727 B1 | 2/2014 |
| KR | 10-2014-0142381 A | 12/2014 |
| KR | 10-2015-0112287 A | 10/2015 |

* cited by examiner

*Primary Examiner* — Duy M Dang
(74) *Attorney, Agent, or Firm* — Sughrue Mion, PLLC

(57) ABSTRACT

Provided is a method for detecting fog from an image, the method including: generating a histogram based on a luminance signal of the image; calculating a histogram width from the histogram; calculating a color contrast value based on color signals of the image; and detecting a fog level of the image based on the histogram width and the color contrast value.

20 Claims, 10 Drawing Sheets

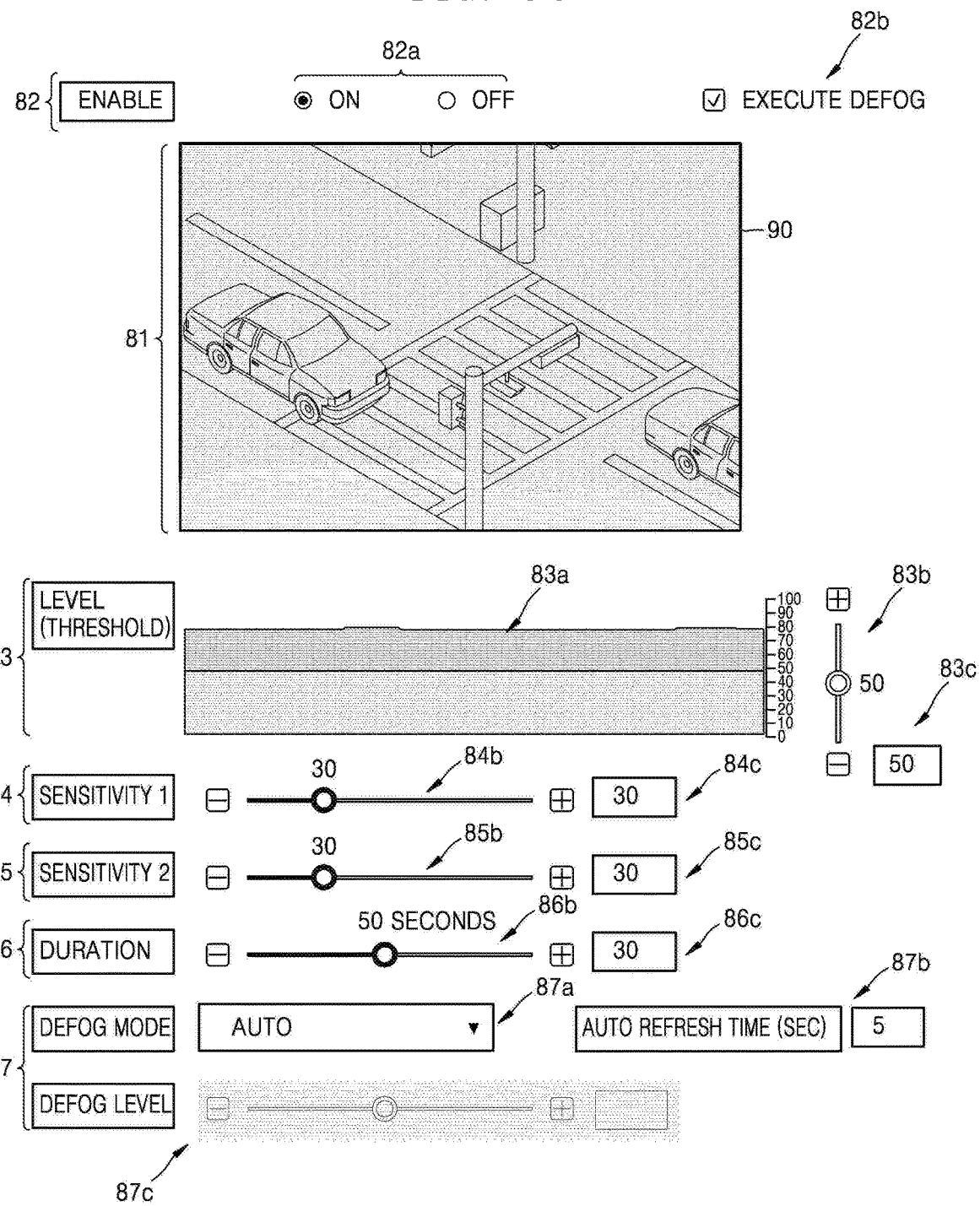

METHOD AND APPARATUS FOR DETECTING FOG FROM IMAGE

CROSS-REFERENCE TO THE RELATED APPLICATION

This application claims priority from Korean Patent Application No. 10-2017-0043093, filed on Apr. 3, 2017, in the Korean Intellectual Property Office, the disclosure of which is incorporated herein by reference in its entirety.

BACKGROUND

1. Field

One or more exemplary embodiments relate to a method for detecting fog and an apparatus therefor.

2. Description of the Related Art

Since most closed circuit television (CCTV) camera systems operate 24 hours, image analysis systems using CCTV camera images are designed to be robust in various environments. In order to make image analysis systems robust in various environments, the quality of CCTV camera images needs to be always high.

However, when cameras are installed outdoors, image quality is often reduced due to fog or smoke. Accordingly, many CCTV camera technologies for improving image quality by detecting and removing fog have been developed.

SUMMARY

One or more exemplary embodiments include an apparatus and method for accurately detecting a current fog state.

Additional aspects will be set forth in part in the description which follows and, in part, will be apparent from the description, or may be learned by practice of the presented embodiments.

According to an aspect of an exemplary embodiment, there is provided a method of detecting fog from an image, the method including: generating a histogram based on a luminance signal of the image; calculating a histogram width from the histogram; calculating a color contrast value based on color signals of the image; and detecting a fog level of the image based on the histogram width and the color contrast value.

The calculating of the histogram width may include: detecting, from the histogram, a first luminance value and a second luminance value respectively corresponding to a first reference value and a second reference value each indicating a ratio of a number of accumulated pixels to a total number of pixels; and determining a difference between the first luminance value and the second luminance value as the histogram width.

The calculating of the color contrast value may include: detecting a minimum value and a maximum value from among color values of each pixel; calculating an average minimum value and an average maximum value respectively from minimum values and maximum values of all pixels; and determining a difference between the average maximum value and the average minimum value as the color contrast value.

The detecting of the fog level may include detecting the fog level by using an exponential function of a linear combination of the histogram width and the color contrast value.

The fog level may be inversely proportional to a weighted sum of the histogram width and the color contrast value.

The method may further include adjusting sensitivity of the fog level by adjusting a first weight of the histogram width and a second weight of the color contrast value.

The method may further include generating a notification when the fog level satisfies a notification condition.

The generating of the notification may include generating the notification when the fog level maintains equal to or higher than a threshold level for a threshold time period or longer.

The method may further include setting a defogging strength corresponding to the fog level and removing fog from the image according to the defogging strength.

The setting of the defogging strength may include setting, at a predetermined time interval, the defogging strength corresponding to a fog level having a highest frequency from among fog levels detected during the predetermined time interval.

According to another aspect of an exemplary embodiment, there is provided an apparatus for detecting fog from an image, the apparatus including: a memory; and at least one processor to implement a detector configured to generate a histogram based on a luminance signal of the image, calculate a histogram width from the histogram, calculate a color contrast value based on color signals of the image, and detect a fog level of the image based on the histogram width and the color contrast value.

The detector may be further configured to detect, from the histogram, a first luminance value and a second luminance value respectively corresponding to a first reference value and a second reference value each indicating a ratio of a number of accumulated pixels to a total number of pixels and determine a difference between the first luminance value and the second luminance value as the histogram width.

The detector may be further configured to detect a minimum value and a maximum value from among color values of each pixel, calculate an average minimum value and an average maximum value respectively from minimum values and maximum values of all pixels, and determine a difference between the average maximum value and the average minimum value as the color contrast value.

The detector may be further configured to detect the fog level by using an exponential function of a linear combination of the histogram width and the color contrast value.

The fog level may be inversely proportional to a weighted sum of the histogram width and the color contrast value.

The detector may be further configured to adjust sensitivity of the fog level by adjusting a first weight of the histogram width and a second weight of the color contrast value.

The detector may be further configured to generate a notification when the fog level satisfies a notification condition.

The detector may be further configured to generate a notification when the fog level maintains equal to or higher than a threshold level for a threshold time period or longer.

The at least one processor may further implement a removal unit configured to set a defogging strength corresponding to the fog level and remove fog from the image according to the defogging strength.

The removal unit may be further configured to set, at a predetermined time interval, the defogging strength corresponding to a fog level having a highest frequency from among fog levels detected during the predetermined time interval.

BRIEF DESCRIPTION OF THE DRAWINGS

These and/or other aspects will become apparent and more readily appreciated from the following description of the embodiments, taken in conjunction with the accompanying drawings in which:

FIG. 8 and FIGS. 9A through 9C illustrate graphical user interfaces provided by a management device according to exemplary embodiments.

DETAILED DESCRIPTION OF EXEMPLARY EMBODIMENTS

Figure 1:
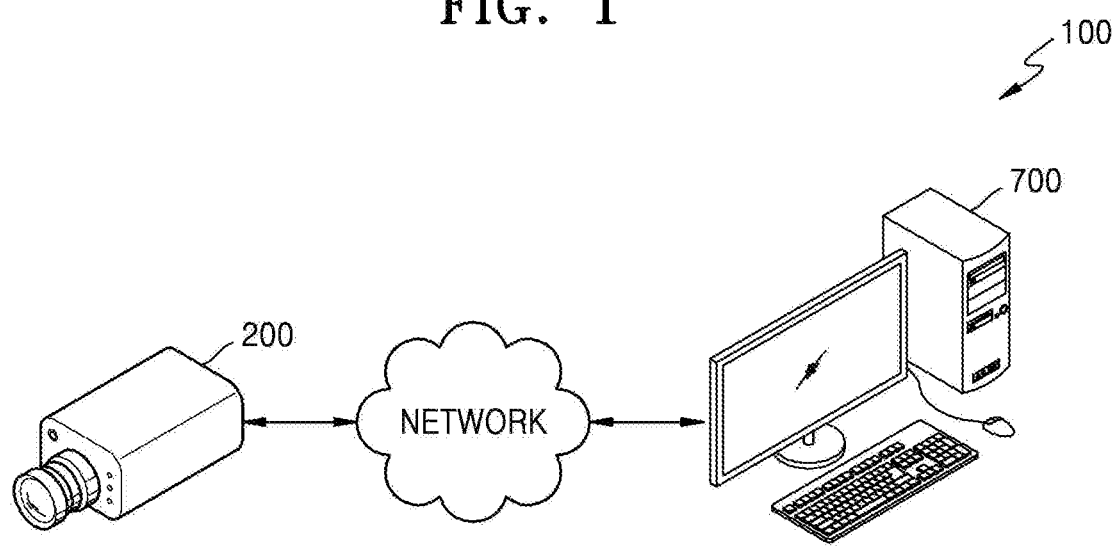
FIG. 1 is a view illustrating a configuration of a defogging system according to an exemplary embodiment.

It will thus be appreciated that one of ordinary skill in the art will be able to devise various arrangements which, although not explicitly described or shown herein, embody the principles of the present disclosure and are included within the spirit and scope thereof. Furthermore, all examples and conditional language recited herein are principally expressly intended only for pedagogical purposes and for aiding the reader to understand the principles of the present disclosure and the concepts contributed by the inventors to furthering the art, and are to be construed without limitation to such specifically recited examples and conditions. Moreover, all statements herein reciting principles, aspects, and embodiments of the present disclosure, as well as specific examples thereof, are intended to encompass both structural and functional equivalents thereof. Additionally, it is intended that such equivalents include both currently known equivalents and equivalents to be developed in the future, i.e., any elements developed or that will be developed to perform the same function, regardless of their structure.

Functions of various devices that are illustrated in drawings including a function block denoted as a processor or as a similar concept with the processor, can be provided not only with specific hardware but also general hardware in which related software may be executed. When these functions are provided by the processor, the functions may be provided by a singular specific processor, a singular sharable processor, or plural processors in which sharing between the plural processors is possible. Also, usage of terms such as a processor, a control, or the like should not be construed as being limited to hardware capable of executing software but should be construed as indirectly including digital signal processor (DSP) hardware, read-only memory (ROM), random-access memory (RAM), and non-volatile memory used for storing software. Other well-known conventional hardware devices may be included.

The advantages and features of the present disclosure and methods of achieving the advantages and features will be described more fully with reference to the accompanying drawings, in which exemplary embodiments are shown. In the description of the present disclosure, certain detailed explanations of related art are omitted when it is deemed that they may unnecessarily obscure the essence of the present disclosure.

It will be further understood that when a part "includes" or "comprises" an element, unless otherwise defined, the part may further include other elements, not excluding the other elements.

As used herein, the term "and/or" includes any and all combinations of one or more of the associated listed items. Expressions such as "at least one of" when preceding a list of elements, modify the entire list of elements and do not modify the individual elements of the list.

The present disclosure will now be described more fully with reference to the accompanying drawings, in which embodiments are shown.

FIG. 1 is a view illustrating a configuration of a defogging system 100 according to an exemplary embodiment.

Referring to FIG. 1, the defogging system 100 may include a camera 200 and a management device 700. The camera 200 may be connected to the management device 700 via a wired network and/or a wireless network.

The camera 200 may be a fixed camera fixedly located in a specific place and having a fixed field of view, or a pan/tilt/zoom (PTZ) camera having PTZ functions. The camera 100 may be a visual camera, a surveillance camera including a special purpose camera, a portable camera, or a camcorder.

The camera 200 may capture an image, detect fog from the captured image, and transmit a notification to an operator. The camera 200 may remove the fog from the captured image and output an image having improved quality.

The camera 200 may extract feature information for determining a fog condition from an image, and determine a fog level by quantifying the extracted feature information. The camera 200 may extract a histogram width and a color contrast value of the image as the feature information. The camera 200 may determine whether a notification is generated based on a change in a fog level according to time. According to such notification and/or a user's settings, the camera 200 may determine whether defogging is to be performed and a defogging degree, and remove fog from the image.

The camera 200 may determine a fog level based on an image captured by frames. The camera 200 may determine whether defogging is to be performed, and perform defogging per a predetermined number of frames after monitoring a fog level change of a series of frames obtained at predetermined time intervals.

The management device 700 may be connected to the camera 200 and request the camera 200 to send an image. The management device 700 may receive the image from the camera 200, provide the image to a display, and monitor images that are being displayed. The management device 700 may be a terminal, such as a personal computer, a smartphone, a tablet, a handheld device, or a server (e.g., a cloud server, a recording server, an upgrade server, or a notification server).

The management device 700 may include an input unit and the display.

Examples of the input unit may include, but is not limited to, a keypad, a dome switch, a touchpad (e.g., a touch pad using a contact-type capacitive method, a pressure-type resistive film method, an infrared detection method, a surface ultrasonic conduction method, an integral-type tension measurement method, or a piezoelectric effect method), a mouse, a remote controller, a jog wheel, and a jog switch.

Examples of the display may include, but are not limited to, a liquid crystal display (LCD) panel, an organic light-emitting display (OLED) panel, and an electrophoretic display (EPD) panel. The display may be provided with a touchscreen to receive an input through the user's touch, thereby operating as a user input interface.

Figure 2:
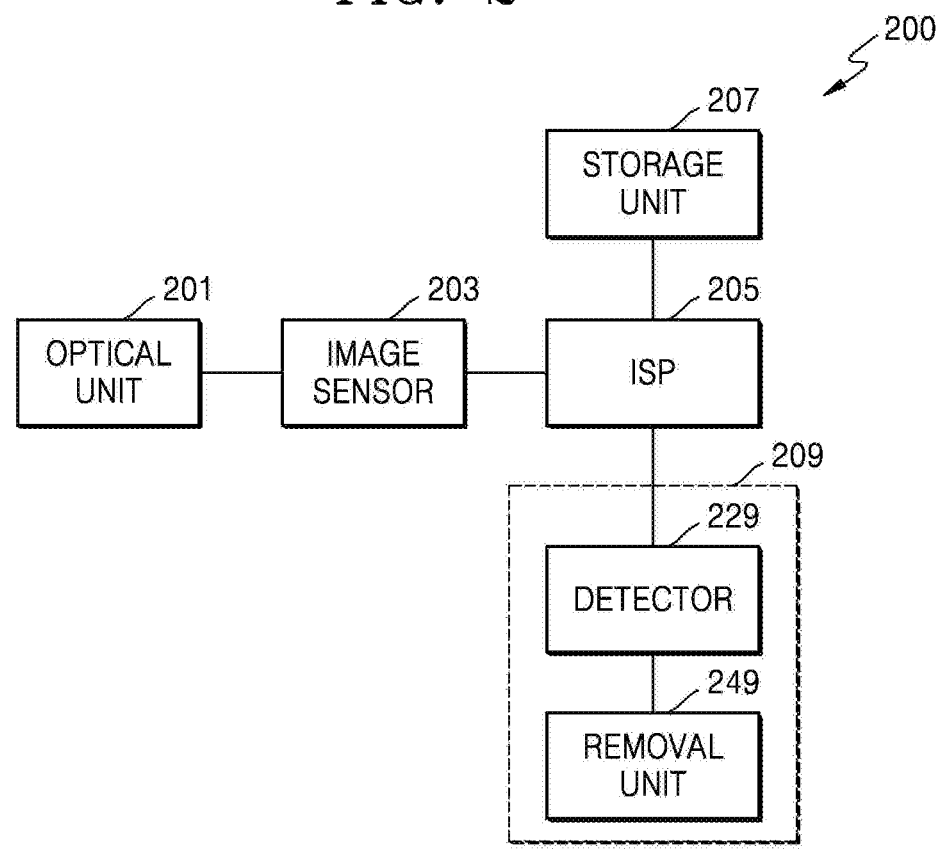
FIG. 2 is a block diagram illustrating a configuration of a camera according to an exemplary embodiment.

FIG. 2 is a block diagram illustrating a configuration of the camera 200 according to an exemplary embodiment.

Referring to FIG. 2, the camera 200 may include an optical unit 201, an image sensor 203, an image signal processor (ISP) 205, a storage unit 207, and a fog detector 209.

The optical unit 201 may include an optical system such as a zoom lens, a focus lens, and an iris for adjusting the amount of light.

The image sensor 203 may convert light passing through the optical unit 201 into an electrical image signal. The image sensor 203 may be a photoelectric conversion device such as a charge-coupled device (CCD) or a complementary metal-oxide-semiconductor (CMOS) image sensor.

The ISP 205 may include a various number of hardware or/and software components for executing specific functions. For example, the ISP 205 may be implemented with, for example, a hardware-implemented data processing device having circuitry that is physically structured to perform desired functions. Such functions may be represented as code and/or instructions included in a program. Examples of the above-referenced hardware-implemented data processing device include, but are not limited to, a microprocessor, a central processing unit (CPU), a processor core, a multiprocessor, an application-specific integrated circuit (ASIC), and a field programmable gate array (FPGA). Processors executing program code are programmed processors, and thus, are special-purpose computers. Functions of the ISP 205 may be implemented with any programming or scripting language, and employ various algorithms implemented with any combination of data structures, objects, processes, routines or other programming elements.

The ISP 205 may perform signal processing for improving image quality, such as noise reduction, gamma correction, color filter array interpolation, color correction, or color enhancement, on a digital image signal from the image sensor 203 or a digital image signal obtained by converting an analog image signal from the image sensor 203. A color domain of an image may be a YUV domain, an RGB domain, or an YCbCr domain. The ISP 205 may output a color image of an RGB domain. The ISP 205 may store an image in the storage unit 207.

The storage unit 207 may store a program for processing and controlling the ISP 205, and temporarily store pieces of data (e.g., an image) that are input to or output from the camera 200. The storage unit 207 may include at least one type of storage medium from among a flash memory type, a hard disk type, a multimedia card micro type, a card-type memory (e.g., an SD or XD memory), RAM, and ROM. Also, the storage unit 207 may be implemented with a web storage that performs a storage function on the Internet.

The fog detector 209 may detect fog through image analysis and generate a notification accordingly. If necessary, the fog detector 209 may perform defogging on an image. The fog detector 209 may detect fog based on a luminance signal and a color signal of the image. For example, the fog detector 209 may detect fog based on a Y value and an RGB value of the image. The fog detector 209 may include a detector 229 and a removal unit 249.

The detector 229 may obtain a Y value and an RGB value of each pixel in an image. When an input image is in the YUV domain, the detector 229 may obtain a Y value of each pixel, and convert the YUV domain into the RGB domain, to obtain an RGB value of each pixel. Alternatively, when an input image is in the RGB domain, the detector 229 may obtain an RGB value of each pixel, and convert the RGB domain into the YUV domain, to obtain a Y value of each pixel. Alternatively, the detector 229 may convert an image in other color domain into an image in the YUV domain and an image in the RGB domain, to obtain a Y value and an RGB value. In another exemplary embodiment, the ISP 205 may obtain a Y value and an RGB value of an image and output the Y value and the RGB value to the detector 229.

The detector 229 may generate a histogram of an input image based on a Y value. The histogram is a graph indicating a luminance distribution of the image. In the histogram, the x-axis may represent a luminance value and the y-axis may represent a frequency indicating the number of pixels having the luminance value.

Figure 3A:
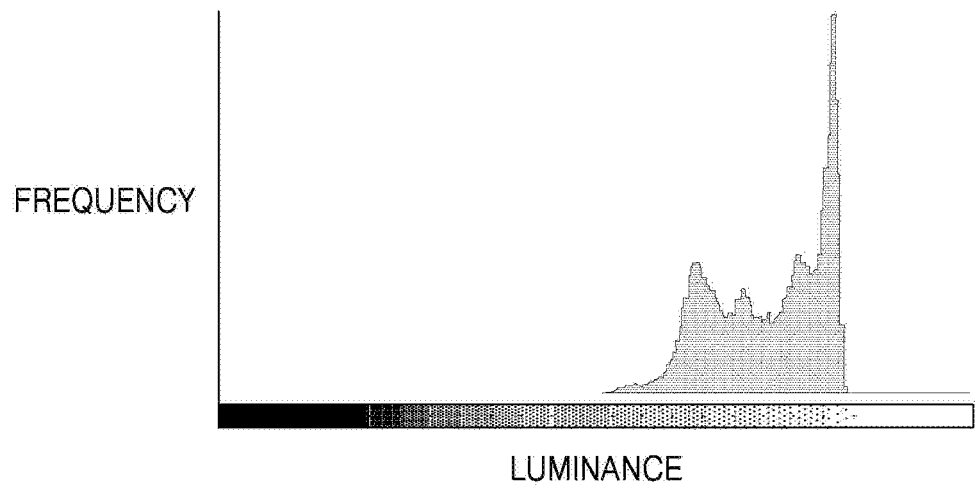
FIG. 3A illustrates a histogram generated based on a Y value of an image that is captured when there is fog, according to an exemplary embodiment.
Figure 3B:
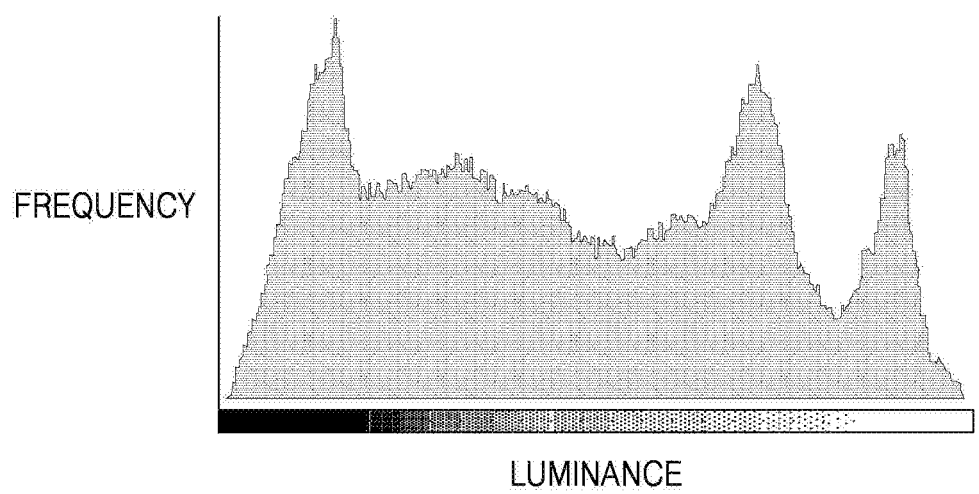
FIG. 3B illustrates a histogram generated based on a Y value of an image that is captured when there is no fog, according to an exemplary embodiment.

FIG. 3A illustrates a histogram generated based on a Y value of an image that is captured when there is fog. On the other hand, FIG. 3B is a histogram generated based on a Y value of an image that is captured when there is no fog. The image captured when there is fog is unclear due to the effect of fog, and thus most pixels in the histogram of FIG. 3A have high pixel values. In contrast, the image captured when there is no fog is clear without degrading image quality due to fog, and pixel values in the histogram are distributed over a wide range of luminance. Once fog is formed, an image is unclear and most portions of the image appear to have similar colors. Accordingly, when fog density increases, a width of a histogram decreases and a distribution is concentrated to the right.

The detector 229 may quantify a width of a histogram. The detector 229 may calculate a histogram width HW that is a difference between a first reference luminance value A and a second reference luminance value B. The detector 229 may detect the first reference luminance value A and the second reference luminance value B on the x-axis by accumulating pixels beginning from the leftmost pixel(s) of the histogram.

The number of pixels accumulated at a graph start position of the histogram is 0 and the number of pixels accumulated at a graph end position is the total number of pixels. The first reference luminance value A may be a luminance value of the x-axis at which a ratio of the number of pixels accumulated from the graph start position of the histogram with respect to the total number of pixels is a first reference value. The second reference luminance value B may be a luminance value of the x-axis at which a ratio of the number of pixels accumulated beginning from the graph start position of the histogram to the total number of pixels, or a ratio of the number of pixels reversely accumulated beginning from the graph end position of the histogram is a second reference value. For example, the first reference value may be the bottom 1%, and the second reference value may be the bottom 99% or the top 1%. In this case, when the total number of pixels is 76,800, the first reference luminance value A may be a luminance value of the x-axis at which the number of accumulated pixels starts to exceed 768 and the second reference luminance value B may be a luminance value of the x-axis at which the number of accumulated pixels start to exceed 76,032.

Figure 4A:
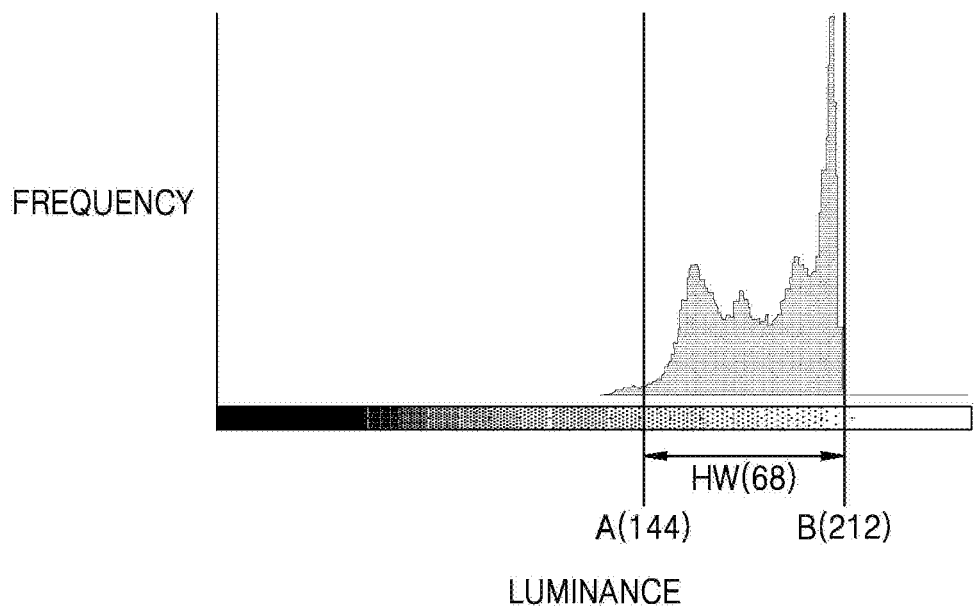
FIG. 4A illustrates a histogram width calculated from the histogram of FIG. 3A.
Figure 4B:
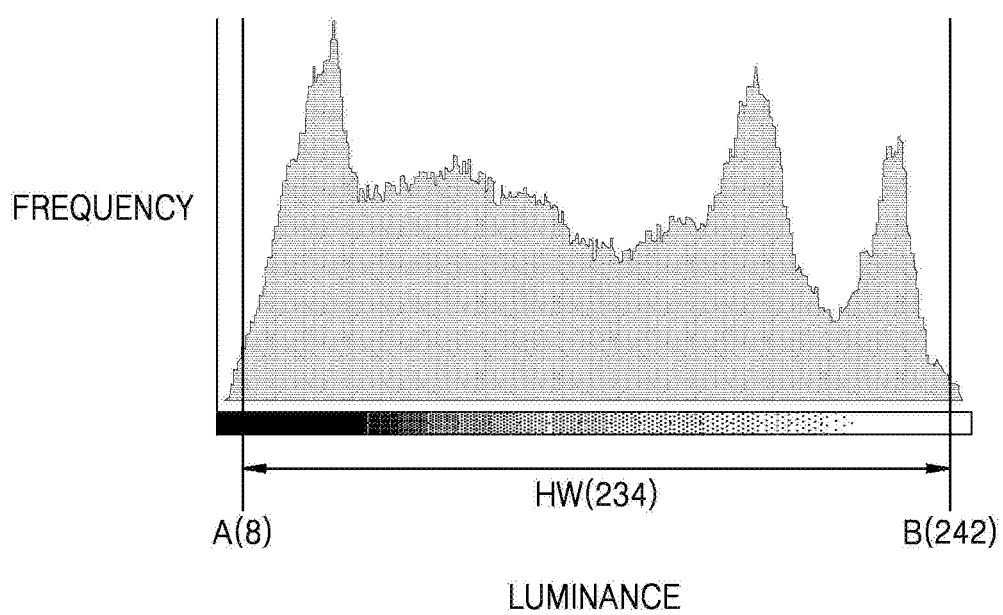
FIG. 4B illustrates a histogram width calculated from the histogram of FIG. 3B.

FIG. 4A illustrates a case where the histogram width HW is calculated from the histogram of FIG. 3A. On the other hand, FIG. 4B illustrates a case where the histogram width HW is calculated from the histogram of FIG. 3B. It is shown from FIGS. 4A and 4B that when fog is formed, a width of a histogram is reduced. As fog density increases, a width of a histogram decreases.

In FIG. 4A, the first reference luminance value A is 144 that is a luminance value at which the number of accumulated pixels exceeds the bottom 1%, and the second reference luminance value B is 212 that is a luminance value at which the number of accumulated pixels exceeds the top 1%. The histogram width HW is a difference (i.e., 212−144=68) between the first reference luminance value A and the second reference luminance value B.

In FIG. 4B, the first reference luminance value A is 8 that is a luminance value at which the number of accumulated pixels exceeds the bottom 1%, and the second reference luminance value B is 242 at which the number of accumulated pixels exceeds the top 1%. The histogram width HW is a difference (i.e., 242−8=234) between the first reference luminance value A and the second reference luminance value B.

The detector 229 may calculate a color contrast value based on an RGB value.

$$\text{dark}(x) = \min_{n \in (r,g,b)} I_n(x) \quad \text{Equation 1}$$

$$\text{bright}(x) = \min_{n \in (r,g,b)} I_n(x)$$

The detector 229 may detect a minimum value dark(x) and a maximum value bright(x) from among an R value, a G value, and a B value of each pixel x. For example, an [R, G, B] value of the pixel x is [160, 30, 100], the minimum value dark(x) and the maximum value bright (x) are respectively 30 and 160.

$$\text{dark} = \frac{\sum_{x \in X} \text{dark}(x)}{\text{total number of pixels}} \quad \text{Equation 2}$$

$$\text{bright} = \frac{\sum_{x \in X} \text{bright}(x)}{\text{total number of pixels}}$$

The detector 229 may calculate an average minimum value 'dark' and an average maximum value 'bright' as shown in Equation 2. The average minimum value 'dark' is obtained by dividing a value obtained by summing all minimum values dark(x) of pixels of the image by the total number of pixels. The average maximum value 'bright' is obtained by dividing a value obtained by summing all maximum values bright(x) of pixels of the image by the total number of pixels. The total number of pixels may be calculated by multiplying a width W of the image by a height H of the image.

The detector 229 may calculate a difference between the average maximum value 'bright' and the average minimum value 'dark' as a color contrast value AC. When fog is formed, an image is unclear, thereby resulting in poor color reproduction. Colors of an image are clearer as a difference between an R value, a G value, and a B value of each pixel increases. Accordingly, as fog density increases, the color contrast value AC decreases.

$$\text{Level} = \exp\left(-\frac{1}{2}(\mu \cdot HW + v \cdot AC) + \sigma\right) \times 100 \quad \text{Equation 3}$$

The detector 229 may set a fog level by using the histogram width HW and the color contrast value AC as shown in Equation 3. The fog level may be calculated as an exponential function of a linear combination of the histogram width HW and the color contrast value AC.

When fog detection is performed by only using histogram information, a false notification is often generated due to wrong fog detection even when fog is not actually formed. For example, when fog is not formed but an image is completely dark due to dark lighting, the histogram width H is small, like in an image captured when fog is formed. According to an exemplary embodiment, however, false fog detection may be reduced and fog may be more accurately detected because both luminance information and color information are used.

σ of Equation 3 may be a constant or a function and set by a user based on experience or experiments. A first weight μ of the histogram width HW and a second weight v of the color contrast value AC may be set by the user. When the first weight μ and the second weight v are set to be high, a weighted sum greatly changes even with a small change in the histogram width HW and/or the average contrast value AC, thereby causing the fog level to sensitively change. As the first weight μ is high, a variation amount of a fog level value due to the histogram width HW is large, and as the second weight v is high, a variation amount of a fog level value due to the color contrast value AC is large.

When color information is sufficient but there is a big change in lighting, the user may reduce the first weight μ and may increase the second weight v. When color information of an image is not sufficient, the user may increase the first weight μ and may reduce the second weight v.

Figure 5:
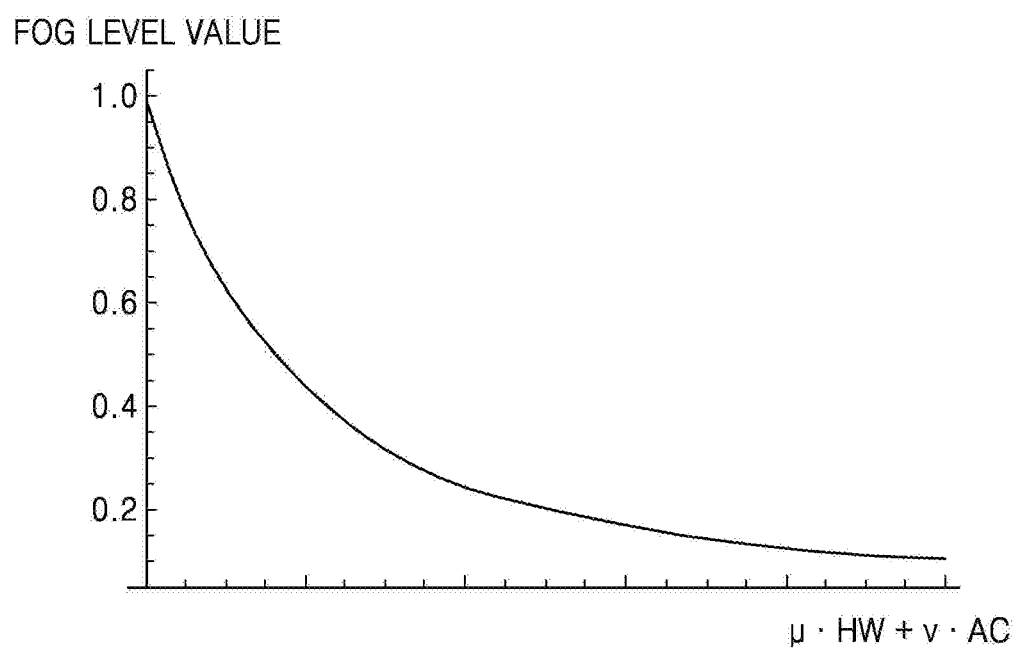
FIG. 5 is a graph illustrating relation between a fog level value and a histogram width/an average contrast value according to an exemplary embodiment.

FIG. 5 is a graph illustrating relation between a fog level value and the histogram width HW/the color contrast value AC according to an exemplary embodiment.

Referring to FIG. 5, the x-axis of the graph represents a weighted sum of the histogram width HW and the color contrast value AC, and the y-axis of the graph represents a fog level value that is a resultant value of an exponential function of Equation 3. As the weighted sum of the histogram width HW and the color contrast value AC increases, the fog level value decreases. A graph or a lookup table obtained by building database with a weighted sum of the histogram width HW and the color contrast value AC, which is previously obtained, and a defogging level corresponding to the weighted sum may be stored in the camera 200 in advance.

The detector 229 may set a fog level as an integer between 0 and 100 by processing a decimal part of the fog level value by using rounding up, rounding off, or rounding and multiplying the processed value by 100.

The detector 229 may compare the fog level with a threshold level. When the fog level is equal to or higher than the threshold level, a duration time of the fog level equal to or higher than the threshold level may be compared with a threshold time period. The detector 229 may generate a notification when the fog level equal to or higher than the threshold level lasts for the threshold time period or longer. A temporarily high the fog level due to noise or a temporary factor may be filtered by considering a duration time. The threshold level and the threshold time period may be set by the user. When a low threshold level and a short threshold time period are set, a notification may be easily generated. The detector 229 may generate a notification by using a visual means (e.g., a warning light), an auditory means (i.e., an alarm), and/or any other means (i.e., sending a text).

The removal unit 249 may remove fog of an image according to a defog mode. The defog mode may include first through third modes, and may be set by the user. The removal unit 249 may adjust a defogging degree of the image according to a defogging strength.

The first mode may be an "off" mode. When the removal unit 249 is set to the "off" mode, defogging of the image may not be performed regardless of whether fog is formed and/or a notification is generated.

The second mode may be a "manual" mode. When the removal unit 249 is set to the "manual" mode, defogging may be performed on the image according to a defogging strength set by the user. For example, the defogging strength may have 10 levels, with the tenth level being the strongest. The user may select a level of the defogging strength after observing the image, and the removal unit 249 may remove the fog of the image according to the selected level.

The third mode may be an "auto" mode. In the auto mode, the removal unit 249 may automatically determine a defogging strength corresponding to a fog level output from the detector 229.

The removal unit 249 may perform defogging in real time or at a predetermined time interval. Generally, fog does not change abruptly but relatively slowly changes. When defogging is performed in real time, a defogging strength may change as a fog level changes due to noise or a temporary factor, thereby resulting in screen flickering. Accordingly, the removal unit 249 may determine a defogging strength at a time interval determined by the user's settings and perform defogging based on the determined defogging strength. The removal unit 249 may monitor fog levels occurring during a set time interval, and determine a defogging strength by using a fog level that occurs with a highest frequency. The removal unit 249 may apply a higher weight to a fog level that occurs closer to the time when a defogging strength is determined, thereby increasing the impact of recent fog levels on the defogging strength.

When a fog level is 0, the removal unit 249 may not perform defogging. When a fog level is equal to or higher than 1, the removal unit 249 may determine one of 10 defogging strength levels. For example, when a fog level is 13, a defogging strength level may be determined to be 2, and when a fog level is 67, a defogging strength level may be determined to be 7. The 10 levels of a defogging strength are exemplary, and thus the number the defogging strength levels may be modified.

A defogging algorithm is not limited to a specific one, and any of various well-known defogging algorithms which use parameters for adjusting a defogging strength may be used.

When a defog mode is a first mode and the detector 229 generates a notification, the removal unit 249 may automatically change the defog mode to a third mode. In this case, the removal unit 249 may not perform defogging when fog is not formed and the removal unit 249 may perform defogging automatically when fog is formed, thereby improving image quality.

Although the ISP 205 and the fog detector 209 are separately depicted in FIG. 2, exemplary embodiments are not limited thereto and the ISP 205 may also perform a function of the fog detector 209. Also, the fog detector 209 may be implemented as separate hardware and/or software and may perform functions. And the detector 229 and the removal unit 249 of the fog detector 209 may be implemented as separate hardware and/or software and may perform respective functions.

Figure 6:
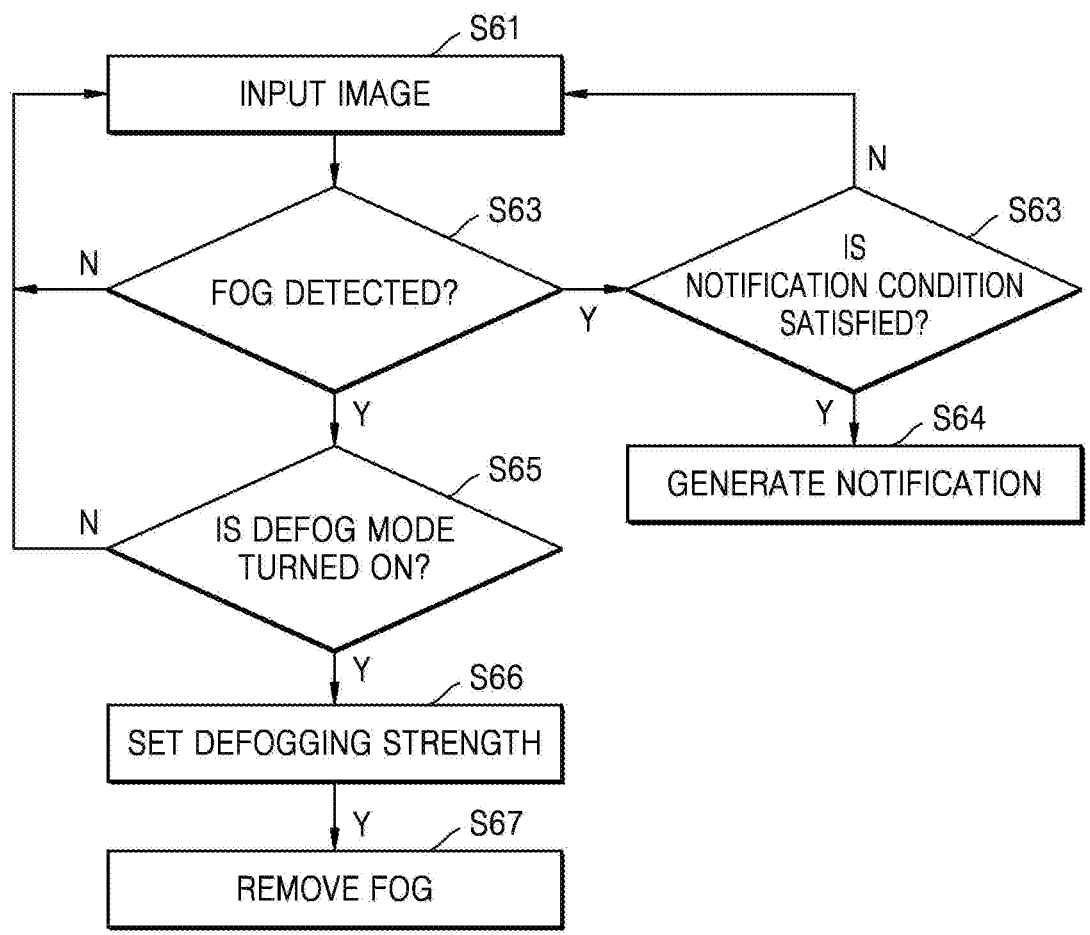
FIG. 6 is a flowchart of a method for processing an image according to an exemplary embodiment.

FIG. 6 is a flowchart of a method for processing an image according to an exemplary embodiment. The method of FIG. 6 may be performed by the fog detector 209 of FIG. 2. The same description as that made with reference to FIGS. 2 through 5 will not be given.

Referring to FIG. 6, in operation S61, an image is input.

In operation S62, the fog detector 209 may detect fog. Specifically, the fog detector 209 may determine whether fog exists by analyzing the image.

In operation S63, if fog is detected in operation S62, the fog detector 209 determines whether a fog level satisfies a notification condition. When it is determined that the fog level satisfies the notification condition, the method proceeds to operation S64.

In operation S64, a notification may be generated. The fog detector 209 may generate a notification when the notification condition is met. For example, the notification condition may be satisfied if the fog level is equal to or higher than a threshold level and lasts for a threshold time period or longer.

In operation S65, if fog is detected in operation S62, the fog detector 209 may determine whether a defog mode is turned on. When it is determined that the defog mode is turned on, the method proceeds to operation S66. Operation S63 and operation S65 may be operated independently, and subsequently or simultaneously.

In operation S66, a defogging strength may be set. As aforementioned, the defog mode may include a first mode that is an "off" mode, a second mode that is a "manual" mode, and a third mode that is an "auto" mode. When the defog mode is turned on, the defog mode may be the second mode or the third mode. When the defog mode is the second mode, a user may set a defogging strength. When the defog mode is the third mode, the fog detector 209 may automatically set a defogging strength according to the fog level.

In operation S67, the defogging unit 209 may remove the fog of the image according to the set defogging strength. The defogging unit 209 may adjust the degree of the defogging algorithm, i.e., the defogging strength level, according to the defogging strength as set by the user or as set automatically.

Figure 7:
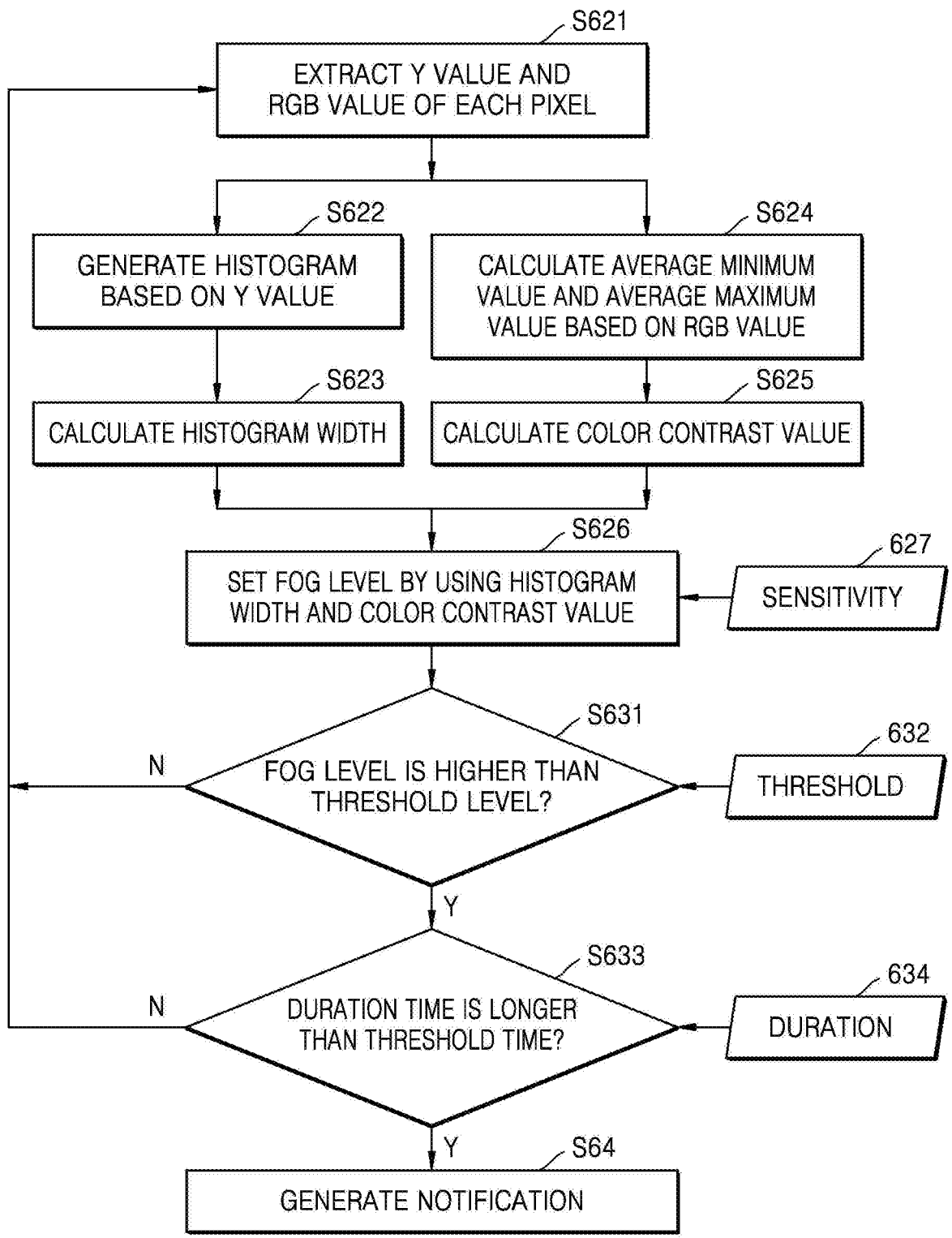
FIG. 7 is a flowchart of a method for detecting fog in an image and generating a notification, according to an exemplary embodiment.

FIG. 7 is a flowchart of a method for detecting fog in an image and generating a notification according to an exemplary embodiment.

The fog detector 209 may detect fog by using a Y value (i.e., a luminance value) and an RGB value (i.e., a color value) of an image. In operation S621, the fog detector 209 may extract a Y value and an RGB value of each pixel from the image.

In operation S622, the fog detector 209 may generate a histogram based on the Y value.

In operation S623, the fog detector 209 may calculate a histogram width. The histogram width may be a difference between a first reference luminance value and a second reference luminance value. The first reference luminance value may be a luminance value corresponding to a position on the x-axis of the histogram at which the number of forward accumulated (i.e., accumulated from the lowest luminance value) pixels becomes a % of the total number of pixels. The second reference luminance value may be a luminance value corresponding to a position on the x-axis of the histogram at which the number of reversely accumulated (i.e., accumulated from the highest luminance value) pixels becomes b % of the total number of pixels.

In operation S624, the fog detector 209 may calculate an average minimum value and an average maximum value based on the RGB value.

In operation S625, the fog detector 209 may calculate a difference between the average minimum value and the average maximum value as a color contrast value. The average minimum value may be obtained by dividing a sum of all minimum values of RGB values of pixels by the total number of pixels. The average maximum value may be obtained by dividing a sum of all maximum values of RGB values of pixels by the total number of pixels. The average contrast value (i.e., color contrast value) may be a difference between the average maximum value and the average minimum value.

In operation S626, the fog detector 209 may set a fog level by using the histogram width and the color contrast value. The fog detector 209 may receive sensitivity parameters 627 through a user input. The sensitivity parameters 627 may be used as weights for the histogram width and the color contrast value. Therefore, the fog detector 209 may calculate a weighted sum of the histogram width and the color contrast value by using the weights, and set a fog level based on the weighted sum.

In operation S631, the fog detector 209 may compare the fog level with a threshold level. The fog detector 209 may receive a threshold parameter 632 through a user input, which may be used as the threshold level.

When the fog level is equal to or higher than the threshold level, the method proceeds to operation S633. In operation S633, the fog detector 209 may compare a duration time of the fog level with a threshold time period. The fog detector 209 may receive a duration time parameter 634 through a user input, which may be used as the threshold time period.

In operation S64, the fog detector 209 may generate a notification when the duration time of the fog level is determined to be longer than the threshold time period in operation S633.

FIG. 8 and FIGS. 9A through 9C illustrate graphical user interfaces provided by the management device 700 according to exemplary embodiments.

Figure 8:
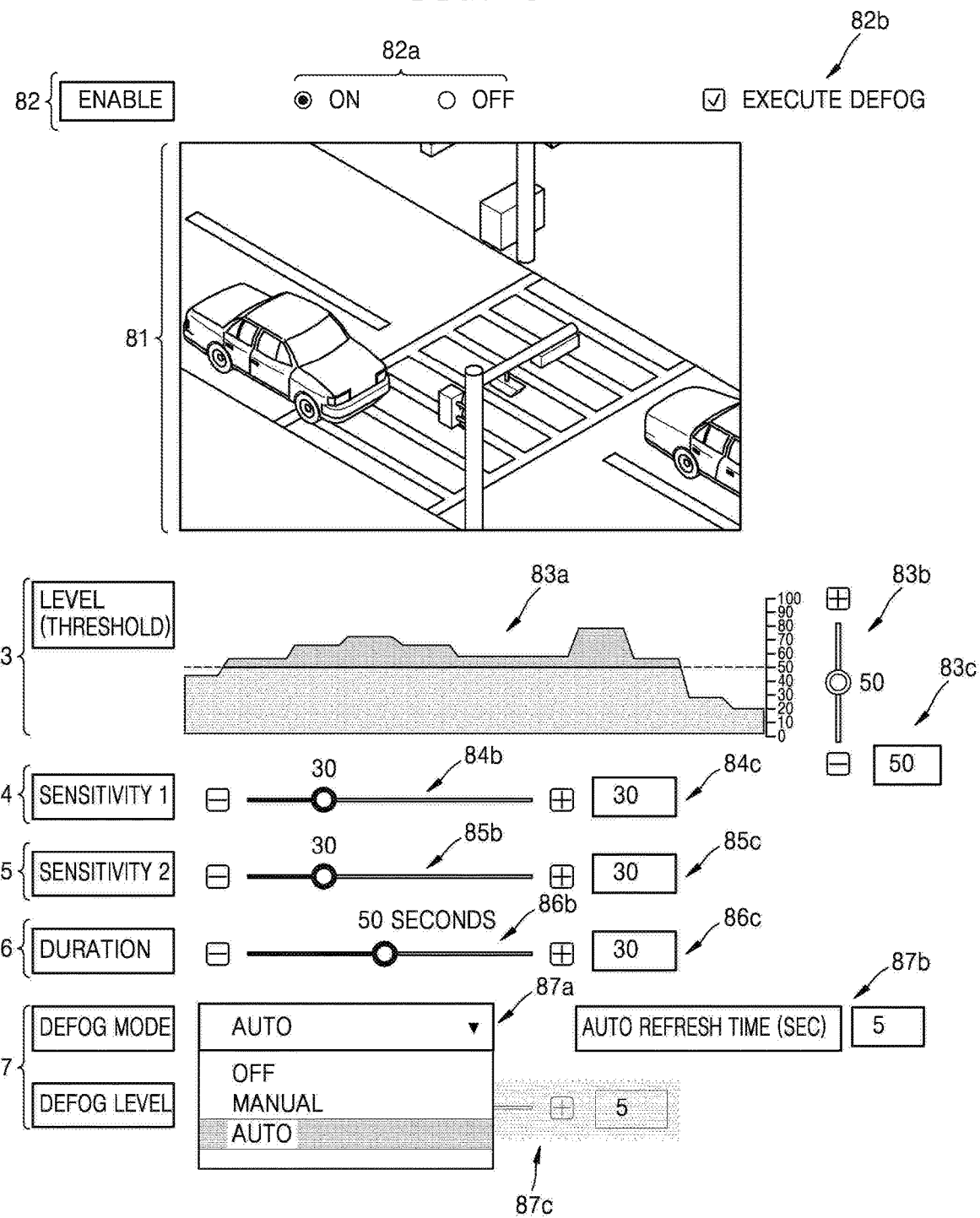

Referring to FIG. 8, the management device 700 may provide a graphical user interface that allows a user to easily and intuitively configure the settings for detecting and removing fog on a display. The user may control a function of the camera 200 connected to the management device 700 and a sensitivity of the function by inputting and adjusting parameters through a user interface using an input device.

The user may adjust a sensitivity of a fog level value by using a sensitivity parameter. The user may determine whether an event occurs at the fog level value by using a threshold parameter. The user may determine a duration time of the event by using a duration parameter and may determine whether a notification is to be generated.

An image that is currently input to the camera 200 may be provided to a first region 81.

An enable icon (on or off) 82a for selecting whether a fog detection function is to be used and an enable icon (execute defog) 82b for selecting whether a defogging function is to be used may be provided to a second region 82.

A level graph 83a indicating a fog level determined in a fog detection step and a sliding bar 83b and/or an edit box 83c for setting a value of a threshold parameter may be provided to a third region 83. A change in the fog level of an image according to time may be displayed from the right to the left or from the left to the right in the level graph 83a. A threshold level may be adjusted by adjusting the value of the threshold parameter. The threshold level adjusted by using the sliding bar 83b and/or the edit box 83c may be displayed as a dashed line on the level graph 83a. The relation between the fog level and the threshold level may be represented using colors in the level graph 83a. For example, user recognition may be improved by using a red color when the fog level is higher than the threshold level and using a blue color when the fog level is lower than the threshold level. As the value of the threshold parameter decreases, a notification is more sensitively, i.e., easily, generated.

A sensitivity parameter may be set in a fourth region 84 and a fifth region 85. A sliding bar 84b and/or an edit box 84c for setting a first sensitivity may be provided to the fourth region 84, and a sliding bar 85b and/or an edit box 85c for setting a second sensitivity may be provided to the fifth region 85. The sensitivity parameter may include the first weight μ of the histogram width HW and the second width v of the color contrast value AC. As a value of the sensitivity parameter increases, the fog level value and/or the fog level more sensitively changes, even with a small change in the histogram width HW and/or the color contrast value AC.

A sliding bar 86b and/or an edit box 86c for setting a duration parameter may be provided to a sixth region 86. A threshold time period may be adjusted by adjusting a value of the duration parameter. As the value of the duration parameter decreases, a notification may be more sensitively (i.e., often) generated.

A unit 87a for setting a defog mode, a unit 87b for setting a defogging interval, and a unit 87c for setting a defogging strength may be provided to a seventh region 87. The defog mode may include a first mode that is an "off" mode, a second mode that is a "manual" mode, and a third mode that is an "auto" mode.

Figure 9A:
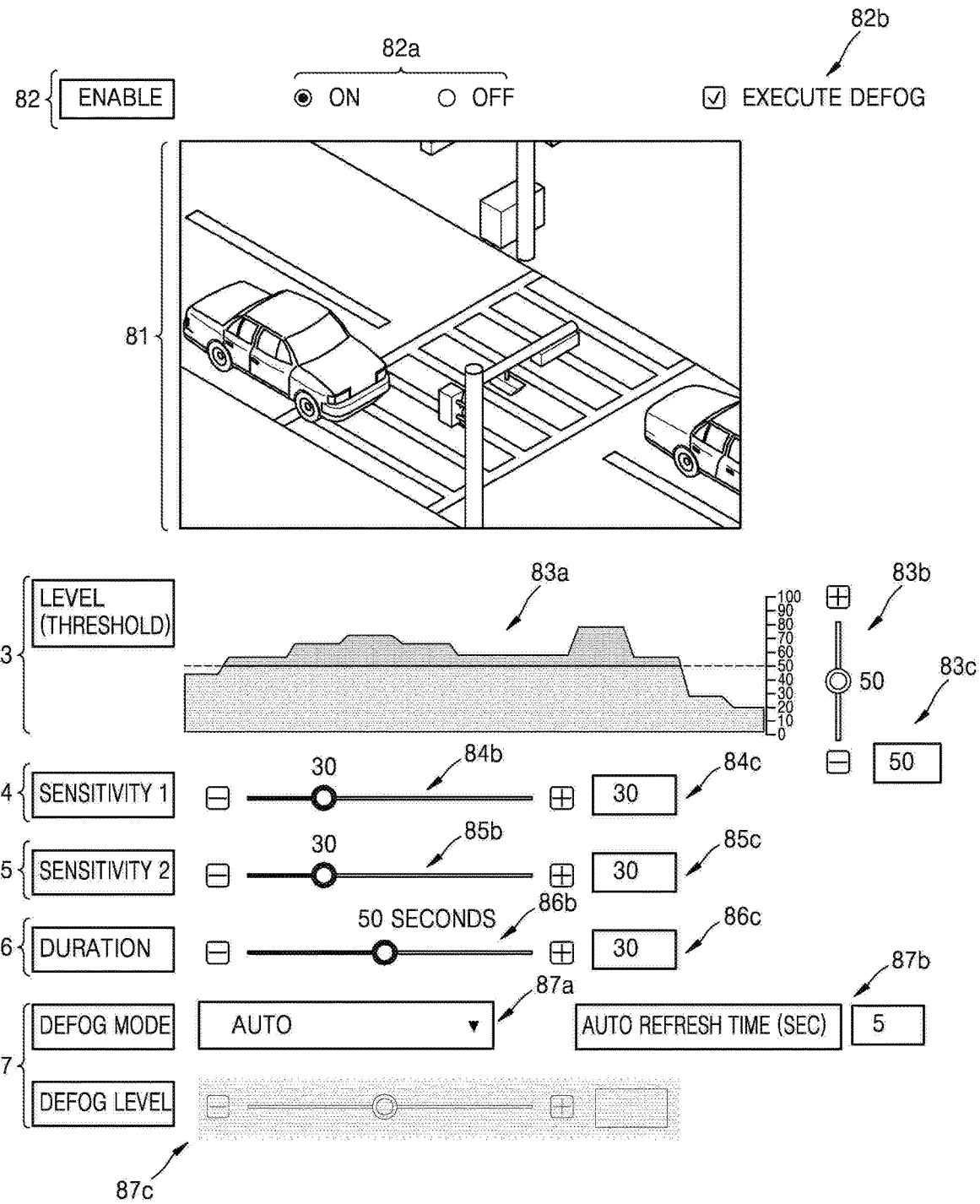

FIG. 9A illustrates a user interface when the auto mode is selected. Referring to FIG. 9A, when the "auto" mode is selected as the defog mode, an edit box that is the unit 87b for setting a defogging interval may be activated. In this case, the unit 87c for setting a defogging strength may be inactivated.

Figure 9B:
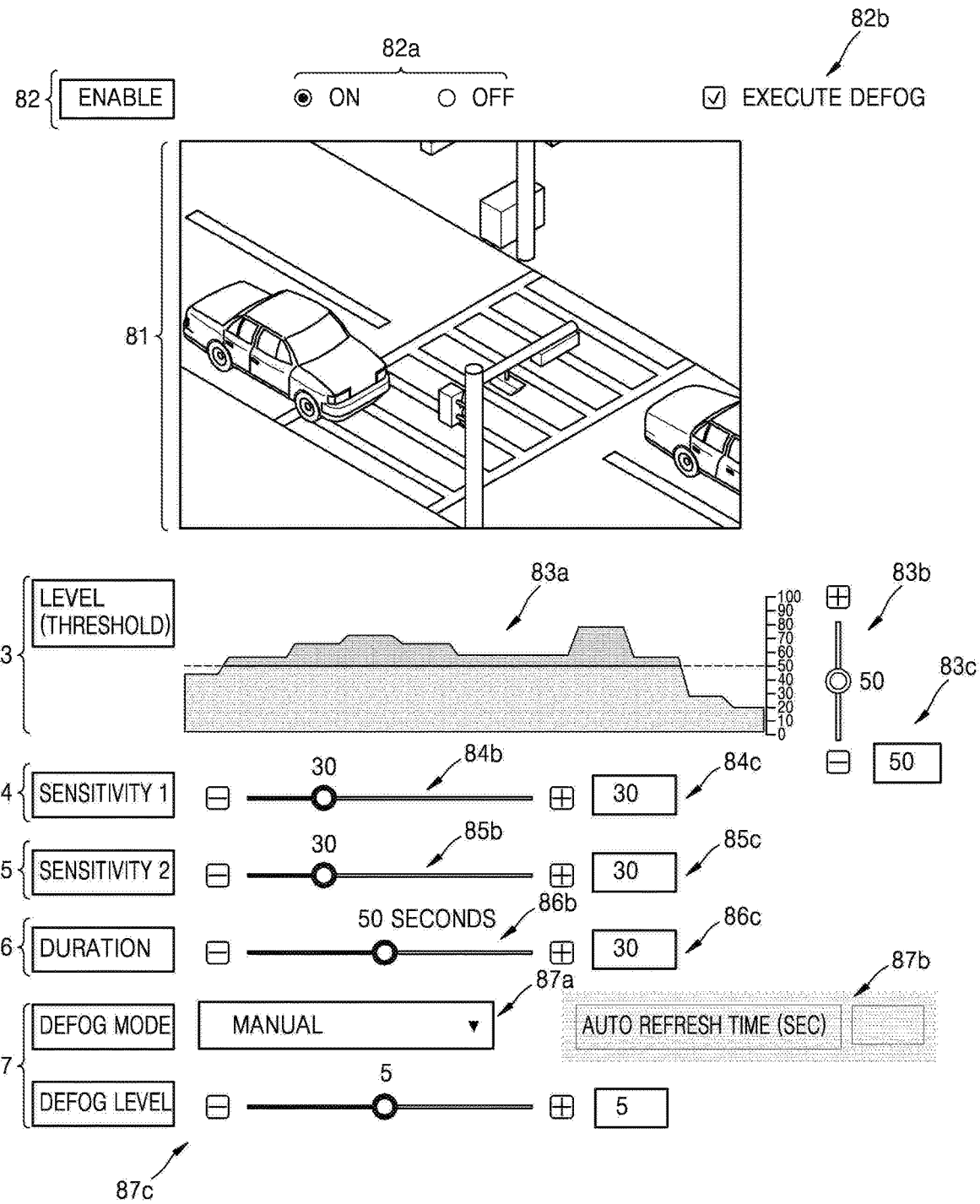

FIG. 9A illustrates a user interface when the manual mode is selected. Referring to FIG. 9B, when the "manual" mode is selected as the defog mode, a sliding bar and/or an edit box that is the unit 87c for setting a defogging strength may be activated. In this case, the unit 87b for setting a defogging interval may be inactivated.

FIG. 9C illustrates a user interface when the fog level equal to or higher than the threshold level lasts longer than the threshold time period. In this case, the camera 200 may generate a notification. Once the notification is generated, the notification may be visually displayed on an image provided to the first region 81. For example, the notification may be displayed to the user by highlighting edges 90 of the first region 81.

According to the exemplary embodiments, a fog condition may be detected by analyzing an image captured by a camera, and when a user desires to remove fog, the fog may be removed from the image. According to the exemplary embodiments, for is detected based on image analysis is used, so no additional device is required other than an image sensor. Also, by using both color information and luminance information based on a histogram, an error in fog detection using only histogram information may be reduced.

According to the exemplary embodiments, details related to fog detection function (e.g., whether to generate a fog detection notification and setting detection sensitivity) and details related to defogging function (e.g., whether to remove fog in the image, setting a defogging strength, and setting a defogging cycle) may be adaptively controlled according to a user's parameter settings. Also, according to the exemplary embodiments, a fog level may be determined and a defogging strength may be adjusted according to the fog level. Also, according to the exemplary embodiments, a user interface may be designed to allow an operator to easily and intuitively configure the settings for detecting a fog condition.

A method and apparatus for detecting fog according to the exemplary embodiments may increase the accuracy of fog detection by using a luminance value and a color value of an image and may detect a fog level for adaptive defogging.

The present disclosure may be embodied as computer-readable code in a computer-readable recording medium. The computer-readable recording medium may be any recording apparatus capable of storing data that is read by a computer system. Examples of the computer-readable recording medium include, but are not limited to, ROMs, RAMs, CD-ROMs, magnetic tapes, floppy disks, and optical data storage devices. The computer-readable medium may be distributed among computer systems that are interconnected through a network, and the present disclosure may be stored and implemented as computer-readable code in the distributed system. Functional programs, code, and code segments for embodying the inventive concept may be easily derived by programmers in the technical field to which the present disclosure pertains.

While the inventive concept has been particularly shown and described with reference to exemplary embodiments thereof, they are provided for the purposes of illustration and it will be understood by one of ordinary skill in the art that various modifications and equivalent other embodiments can be made from the present disclosure. Accordingly, the true technical scope of the present disclosure is defined by the technical spirit of the appended claims.

What is claimed is:

1. A method of detecting fog from an image, the method comprising:
   determining a color domain of the image;
   converting the determined color domain of the image to obtain a luminance signal of the image and RGB values of pixels of the image;
   generating a histogram based on the luminance signal of the image;
   calculating a histogram width from the histogram;
   calculating a color contrast value based on the RGB values of pixels of the image; and
   detecting a fog level of the image based on the histogram width and the color contrast value.

2. The method of claim 1, wherein the detecting of the fog level comprises detecting the fog level by using an exponential function of a linear combination of the histogram width and the color contrast value.

3. The method of claim 2, wherein the calculating of the histogram width comprises:
   detecting, from the histogram, a first luminance value and a second luminance value respectively corresponding to a first reference value and a second reference value each indicating a ratio of a number of accumulated pixels to a total number of pixels; and
   determining a difference between the first luminance value and the second luminance value as the histogram width.

4. The method of claim 2, wherein the calculating of the color contrast value comprises:
   detecting a minimum value and a maximum value from among color values of each pixel;
   calculating an average minimum value and an average maximum value respectively from minimum values and maximum values of all pixels; and
   determining a difference between the average maximum value and the average minimum value as the color contrast value.

5. The method of claim 1, wherein the fog level is inversely proportional to a weighted sum of the histogram width and the color contrast value.

6. The method of claim 5, further comprising adjusting sensitivity of the fog level by adjusting a first weight of the histogram width and a second weight of the color contrast value.

7. The method of claim 1, further comprising generating a notification when the fog level satisfies a notification condition.

8. The method of claim 7, wherein the generating of the notification comprises generating the notification when the fog level maintains equal to or higher than a threshold level for a threshold time period or longer.

9. The method of claim 1, further comprising setting a defogging strength corresponding to the fog level and removing fog from the image according to the defogging strength.

10. The method of claim 9, wherein the setting of the defogging strength comprises setting, at a predetermined time interval, the defogging strength corresponding to a fog level having a highest frequency from among fog levels detected during the predetermined time interval.

11. An apparatus for detecting fog from an image, the apparatus comprising at least one processor to implement:
    a detector configured to determine a color domain of the image, convert the determined color domain of the image to obtain a luminance signal of the image and RGB values of pixels of the image, generate a histogram based on the luminance signal of the image, calculate a histogram width from the histogram, calculate a color contrast value based on the RGB values of pixels of the image, and detect a fog level of the image based on the histogram width and the color contrast value.

12. The apparatus of claim 11, wherein the fog level is inversely proportional to a weighted sum of the histogram width and the color contrast value.

13. The apparatus of claim 12, wherein the detector is further configured to adjust sensitivity of the fog level by adjusting a first weight of the histogram width and a second weight of the color contrast value.

14. The apparatus of claim 11, wherein the detector is further configured to generate a notification when the fog level satisfies a notification condition.

15. The apparatus of claim 14, wherein the detector is further configured to generate a notification when the fog level maintains equal to or higher than a threshold level for a threshold time period or longer.

16. The apparatus of claim 11, wherein the at least one processor further implements a removal unit configured to set a defogging strength corresponding to the fog level and remove fog from the image according to the defogging strength.

17. The apparatus of claim 16, wherein the removal unit is further configured to set, at a predetermined time interval, the defogging strength corresponding to a fog level having a highest frequency from among fog levels detected during the predetermined time interval.

18. An apparatus for detecting fog from an image, the apparatus comprising at least one processor to implement:
a detector configured to generate a histogram based on a luminance signal of the image, calculate a histogram width from the histogram, calculate a color contrast value based on color signals of the image, and detect a fog level of the image based on the histogram width and the color contrast value,
wherein the detector is further configured to detect the fog level by using an exponential function of a linear combination of the histogram width and the color contrast value.

19. The apparatus of claim 18, wherein the detector is further configured to detect, from the histogram, a first luminance value and a second luminance value respectively corresponding to a first reference value and a second reference value each indicating a ratio of a number of accumulated pixels to a total number of pixels and determine a difference between the first luminance value and the second luminance value as the histogram width.

20. The apparatus of claim 18, wherein the detector is further configured to detect a minimum value and a maximum value from among color values of each pixel,
calculate an average minimum value and an average maximum value respectively from minimum values and maximum values of all pixels, and determine a difference between the average maximum value and the average minimum value as the color contrast value.

* * * * *